United States Patent [19]

Dent

[11] Patent Number: 5,619,210

[45] Date of Patent: Apr. 8, 1997

[54] LARGE PHASED-ARRAY COMMUNICATIONS SATELLITE

[75] Inventor: Paul W. Dent, Stehag, Sweden

[73] Assignee: Ericsson Inc., Research Triangle Park, N.C.

[21] Appl. No.: 225,389

[22] Filed: Apr. 8, 1994

[51] Int. Cl.[6] .................................................. H04B 7/185
[52] U.S. Cl. ...................... 342/352; 342/374; 455/13.3; 370/316
[58] Field of Search .................................... 342/353, 354, 342/374; 370/97, 75; 455/13.1, 13.3

[56] References Cited

U.S. PATENT DOCUMENTS

| | | | |
|---|---|---|---|
| 4,703,479 | 10/1987 | Ikeda | 370/104 |
| 4,881,078 | 11/1989 | Yamane et al. | 342/155 |
| 4,901,310 | 2/1990 | Ichiyoshi | 370/75 |
| 5,386,953 | 2/1995 | Stuart | 244/158 R |

FOREIGN PATENT DOCUMENTS

| | | |
|---|---|---|
| 182601 | 5/1986 | European Pat. Off. . |
| 405372 | 1/1991 | European Pat. Off. . |
| 516039 | 12/1992 | European Pat. Off. . |
| 624008 | 11/1994 | European Pat. Off. . |
| WO94/02972 | 2/1994 | WIPO . |

OTHER PUBLICATIONS

Schuss et al., "Design of the Iridium Phased Array Antennas," IEEE Antennas and Propagation Society International Symposium 1993, vol. 1, pp. 218–221, (Jun. 28, 1993).

*Primary Examiner*—Thomas H. Tarcza
*Assistant Examiner*—Dao L. Phan
*Attorney, Agent, or Firm*—Burns, Doane, Swecker & Mathis, L.L.P.

[57] ABSTRACT

A communications satellite is disclosed which uses distributed multiplexing and demultiplexing so as to minimize the amount of cabling needed between deployable phased array panels and a central processor. Signals are distributed from the active array panels to a number of active antenna elements. Each active antenna element has at least a radiating element, a modulator and a sample and hold circuit for forming modulation waveforms.

7 Claims, 9 Drawing Sheets

LARGE PHASED-ARRAY COMMUNICATIONS SATELLITE

FIELD OF THE INVENTION

The present invention relates to a phased array communications satellite, and more particularly to a communications satellite with distributed multiplexing and demultiplexing so as to minimize the amount of cabling needed between deployable phased array panels and the central processing equipment.

BACKGROUND OF THE DISCLOSURE

A cellular communication system can include a number of roaming, automobile-mounted or handheld telephone sets which are served by either fixed, ground-based stations or by orbiting satellites or by a combination of both. The capacity of such systems to serve a large number of subscribers depends on how much of the radio spectrum is allocated for the service and how efficiently the radio spectrum is used. Efficiency of spectral utilization is measured in units of simultaneous conversations (erlangs) per megahertz per square kilometer. In general, spectral efficiency can be improved more by finding ways to re-use the available bandwidth many times over than by attempting to pack more conversations into the same bandwidth, since narrowing the bandwidth generally results in the need to increase spatial separation between conversations thus negating the gain in capacity. Therefore, it is generally better to increase the bandwidth used for each conversation so that closer frequency re-use is possible.

One method to increase the capacity is to use a phased array communications satellite to relay signals from ground stations to a plurality of mobile stations. A ground-controlled orbiting phased array system is disclosed in allowed U.S. patent application Ser. No. 08/179,953 and allowed U.S. patent application Ser. No. 08/179,947, both of which are expressly incorporated herein by reference.

In phased array antennas, feeder links transmit signals to and from a satellite relay station. However, the bandwidth of the feeder links is limited. allowed U.S. patent application Ser. No. 08/225,399 entitled "Multiple Beamwidth Phased Array", which is expressly incorporated herein by reference, discloses a method for efficiently using the limited bandwidth for conveying composite element signals from the ground station to the phase-array satellite transponder using the feeder links.

The prior art does not disclose the use of coherent time-multiplexed feeder links with distributed demultiplexing for reducing the cabling to a deployable phased array. Some prior art systems have separate coaxial cables or waveguides connecting each element of the array to a centrally located transponder. This arrangement was adequate for prior art systems in which the number of antenna elements or beams to be created was small, for example, 6, 19, or 37, but becomes impractical for the number of elements or beams envisioned in the present invention. The present invention eliminates the multiplicity of feeder cables reducing the weight of the system considerably.

SUMMARY OF THE DISCLOSURE

The present invention comprises distributed multiplexing and demultiplexing in order to minimize the amount of cabling between the deployable phased array panels and the central equipment.

According to one embodiment of the present invention, a satellite relay station for communicating between at least one first station and a plurality of second stations is disclosed. The satellite relay station comprises a first number of active antenna panels that are folded up around the satellite in the launch configuration to form a cylinder and that once in orbit are folded down to form a coplanar array. The active antenna panels comprise at least time-multiplexed signal distribution means for distributing signals to a second number of active antenna elements. The second number of active antenna elements are each comprised of at least a radiating element connected to a transmit power amplifier, a modulator circuit with an input for modulating waveforms, and a sample and hold circuit for sampling signals on the signal distribution line and for filtering the sampled signal to form the modulation waveforms.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION OF THE DISCLOSURE

Figure 1A:
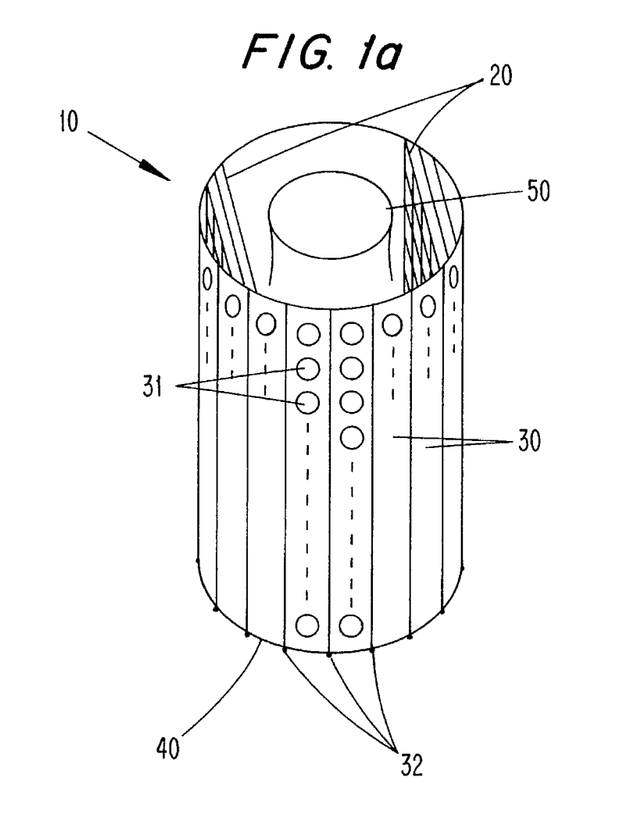
FIG. 1 illustrates a general construction of a satellite in accordance with the present invention.

FIG. 1 illustrates the general arrangement of a satellite according to the present invention. FIG. 1a shows the satellite 10 with a plurality of antenna array panels 30 and solar panels 20 which are folded in a launch configuration to form a more or less cylindrical shape more suited to be accommodated under a launch vehicle fairing for launch. The satellite can also include other usual subsystems such as an apogee boost motor 50 and other subsystems not shown in FIG. 1 such as batteries and power conditioning system, a reaction-wheel attitude control system with attitude sensors, a magnetic torquing system for periodically dumping wheel momentum, a heat-pipe thermal control system, telemetry, tracing and control systems, and the associated communications payload electronics which are well known in the art.

Figure 1B:
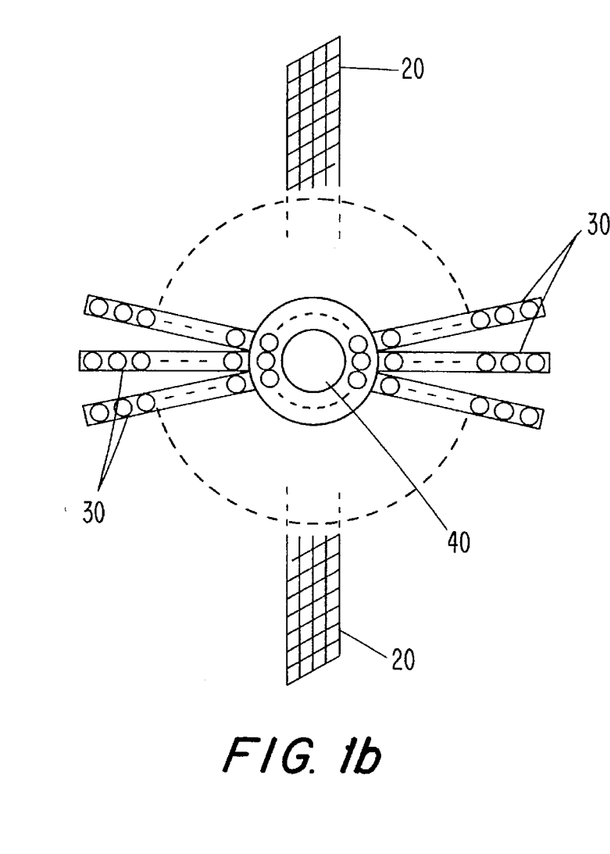

FIG. 1b illustrates the satellite in its usual configuration after the antenna panels and solar panels have been deployed in orbit. The K-band feeder link antennas 40 are located so as to point toward the earth while the spent apogee boost motor points away from the earth. Each antenna panel comprises a large number of antenna elements with associated active phased array modules which form active elements. The active elements can be transmit-only elements, receive-only elements or transmit/receive elements using either time-duplexing or frequency-duplexing. In the latter case, duplexing filters permit simultaneous transmission and reception.

Figure 2:
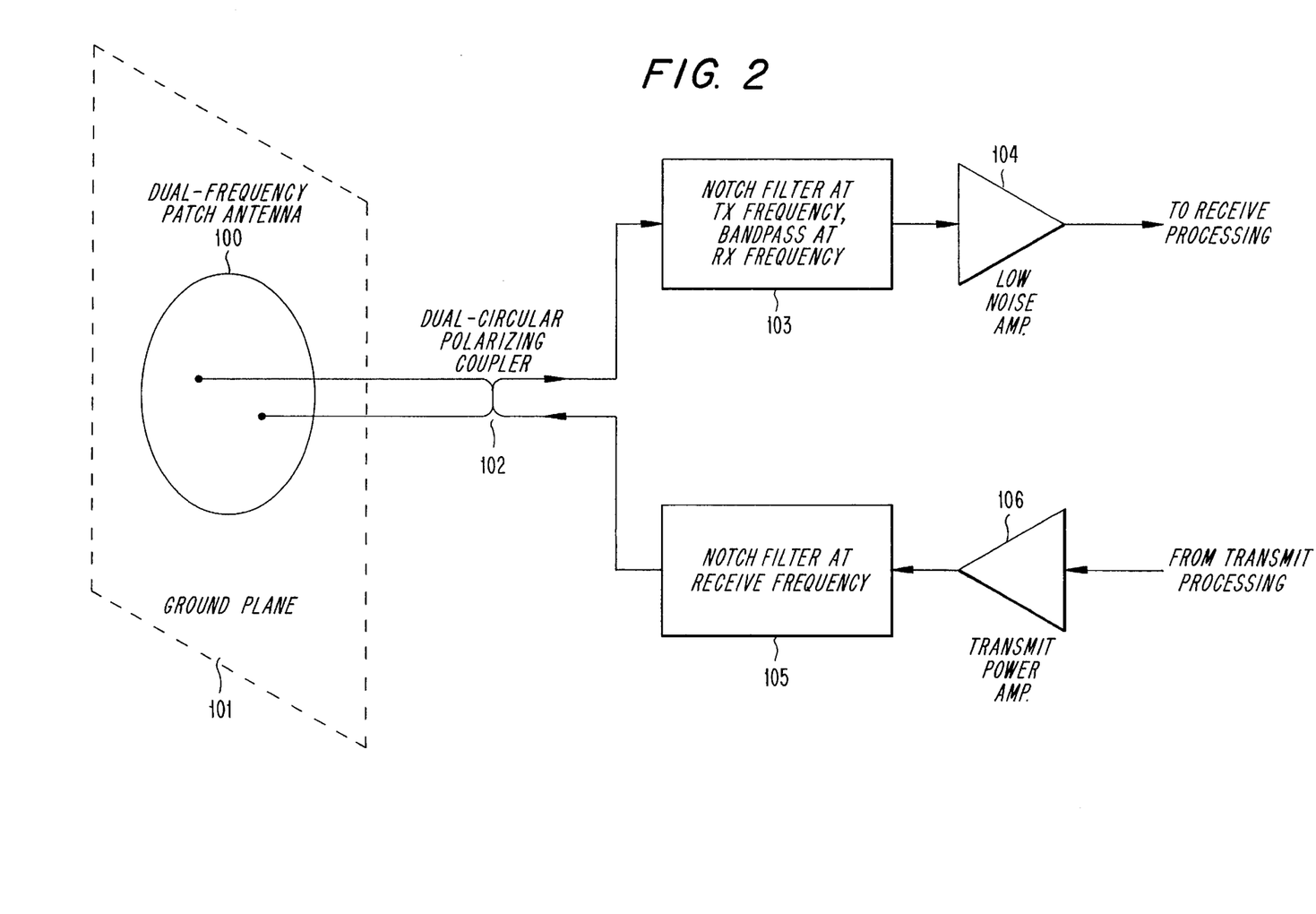
FIG. 2 illustrates an active antenna element for the transmitting and receiving using frequency duplex according to one embodiment of the present invention.

FIG. 2 illustrates a frequency-duplexing configuration according to one embodiment of the present invention. A patch antenna 100 is positioned over a conducting ground plane 101 to form an array element. The ground plane 101 can be, for instance, a printed circuit board with components mounted on the reverse side. The patch antenna 100 is fed at two points 90 degrees offset from center to form cross-linear polarizations. The cross-linear polarizations are convened to RHC and LHC circular polarization by use of a 90-degree, 3 dB coupler 102. One polarization is used for transmitting by connecting a transmit power amplifier 106 through a filter 105 to one input of the coupler 102 and the other coupler port is used for receiving by connecting the port through a filter 103 to a low-noise amplifier 104. The use of opposite polarization for transmitting and receiving gives perhaps 20 db of isolation between the power amplifier 105, which may be transmitting at 1 watt rms, and the low-noise amplifier 104 which may be receiving at $10^{-16}$ watts. Because of this vast disparity in power levels, more isolation than the 20 db of isolation that the coupler provides is needed. The filter 105 presents a block to potentially interfering components and broadband noise at the receive frequency amplified by the power amplifier 106. However, the filter 105 passes the wanted transmit frequencies to the filter 103 which presents a block to residual transmit frequency energy reaching low noise amplifier 104 that might be strong enough to saturate it, while passing the wanted receive frequencies. With sufficient transmit/receive frequency spacing (duplex spacing), such filters as well as the coupler 102 can be cheaply printed on printed circuit panel 101 on which power amplifier 106 and low-noise amplifier elements 104 are also mounted. In some cases, each patch antenna 100 may not always have an associated power amplifier and low-noise amplifier. A number of patch antennas may first have their signal connections joined together to form a "sub-array" before being connected to a panel amplifier and low noise amplifier for that sub-array.

The objective in designing such a sub-array is that the composite radiation diagram formed by coupling its individual elements should cover the entire region over which communications is to be provided. If the radiation diagram is too wide, the number of sub-arrays and consequently associate power amplifiers and low-noise amplifiers will be unnecessarily great, and since each has to receive a signal from the ground stations over the K-band feeder link, the amount of feeder link bandwidth used will be greater than necessary. On the other hand, if the sub-array pattern is too narrow, there will be a loss of gain at the edges of the coverage region. The coverage region may, for example, be taken to be the area of the earth over which the satellite is instantaneously visible at 20 degrees above the horizon or more. Such a loss of gain at the edge of coverage may be minimized by shaping the radiation pattern of each element to give more gain at the edge of coverage, where earth-bound mobile stations are at the greatest slant range, and less gain in the middle of coverage where the satellite is directly overhead and the slant range to the mobile stations is a minimum. The gain at the edge of coverage may also be improved by deliberately using sub-arrays of somewhat wider beamwidth than earth coverage and using more sub-arrays to form the desired beams. This requires more K-band bandwidth, and a factor of two is advantageous if available. Other inventive aspects of allowed U.S. patent application Ser. No. 08/179,947, which has been incorporated herein by reference, may then be employed, such as the use of efficient class-C power amplifiers for transmitting multiple signals, with dissipation of unwanted intermodulation components thereby produced in directions that do not intercept the earth.

Figure 3:
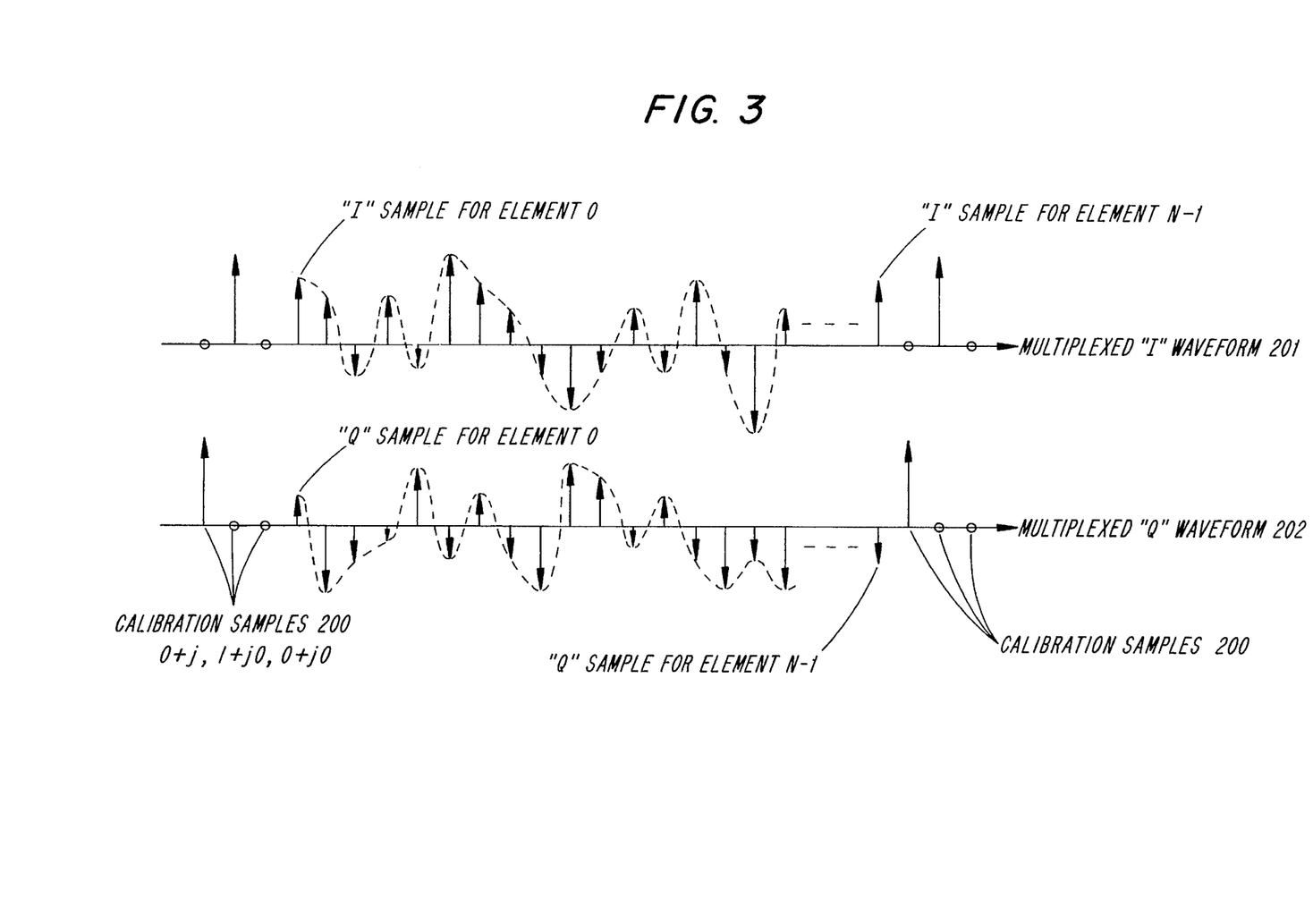
FIG. 3 illustrates a coherent time-multiplex Feeder Link according to one embodiment of the present invention.

FIG. 3 illustrates the time-multiplex format used on the K-band feeder link. For the satellite transmit direction, a ground station signal processor calculates complex (I+jQ) signal samples for each transmit array element which represent a composite signal comprising weighted sums of signals destined for a plurality of mobile stations. The composite signal of each element is calculated so that the combined effect of transmitting them from corresponding satellite array elements will be such that each signal intended for each mobile station will be transmitted in a desired direction. The matrix math operations for generating these signals in a digital signal processor are disclosed in allowed U.S. patent application Ser. No. 08/179,953, which has been incorporated herein by reference.

The signal samples for each element are time-multiplexed into a time-multiplexed 'I' signal 201 representing the real parts of sequential elements and into a time-multiplexed 'Q' signal 202 representing the imaginary parts of successive elements. Known calibration samples 200 may be included in the multiplex format to assist with synchronization and frequency correction at the receiving demultiplexer. The I-multiplexed signal is modulated onto a K-band carrier cosine component while the Q-multiplexed signal is modulated onto a sine carrierwave. This may be performed in a known manner by a quadrature modulator. The modulation can, if desired, first be impressed on to a lower intermediate frequency carrier which is then unconverted to the K-band.

Figure 4:
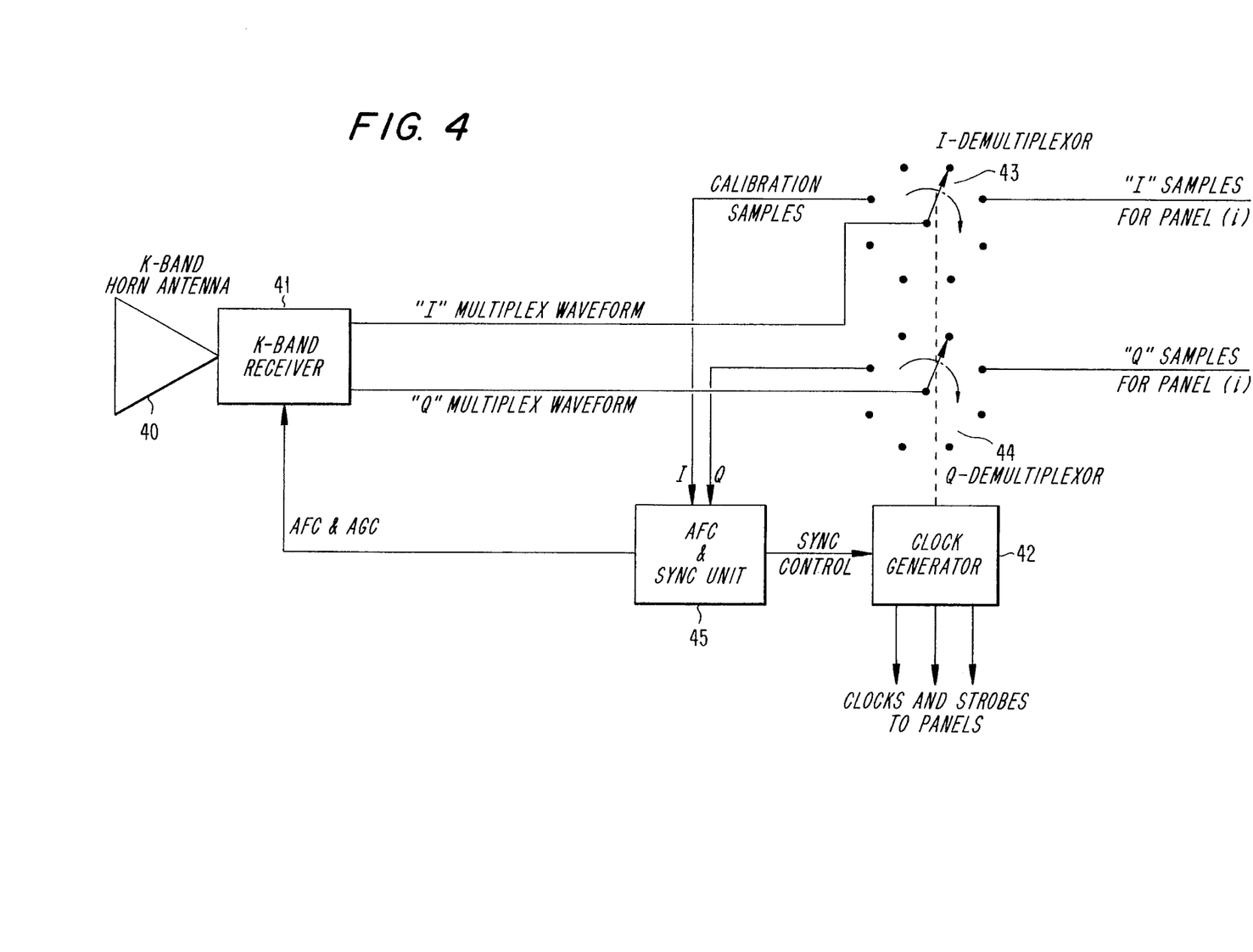
FIG. 4 illustrates a first stage of a receiving demultiplexor according to the present invention.

FIG. 4 illustrates the receiving demultiplexer at the satellite according to one embodiment of the present invention. Signals are received from a ground station on the K-band using the K-band antenna 40. The received signals are amplified, filtered and downconverted using known super-heterodyne receiver 41 principles and finally converted to the complex I,Q baseband using a quadrature demodulator to yield I and Q multiplexed waveforms. These waveforms are sampled by an I-demultiplexer 43 and a Q-demultiplexer 44 to separate waveform samples intended for different array panels. To facilitate this, the order of multiplexing should preferably be

---

Calibration sample 0

Sample for element 0 of panel 0
Sample for element 0 of panel 1
Sample for element 0 of panel 2
Sample for element 0 of panel 3
Sample for element 0 of panel 4
. . .
Calibration sample 1

Sample for element 1 of panel 0
Sample for element 1 of panel 1
Sample for element 1 of panel 2
Sample for element 1 of panel 3
Sample for element 1 of panel 4
. . .
etc.

---

Thus the demultiplexer separates Calibration sample 0 onto a first output; a sample for element 0 of panel 0 onto a second output; a sample for element 0 of panel 1 onto a third output and so-on, and then returns to separate calibration sample 1 onto said first output again; a sample for element 1 of panel 0 on to said second output, and so-on. Thus from output 1, a stream of successive calibration samples 0,1,2, . . . 0,1,2 . . . is produced and sent to synchronization and frequency correction unit 45 while from output 2, a stream of samples for successive elements 0,1,2 . . . of panel 0 is produced. From output 3, a stream of samples for successive elements 0,1,2, . . . of panel 1 is produced and so forth.

The synchronization and frequency correction unit 45 is programmed to expect the a-priori known sequence of calibration samples and controls the timing of the clock generator 42 in order to synchronize the demultiplexers 43 and 44 until the expected stream of calibration samples is received. As an example, suppose the satellite comprises 31 deployable phased array panels and there is one calibration sample dispersed in a total multiplex cycle of 32. The number 32 is preferably a power of 2 because very high-speed multiplexers or demultiplexers can more easily be constructed as a binary tree of bipolar transistor switches, wherein pairs of signals are multiplexed in a set of first stage multiplexers, pairs of the pairs are further multiplexed in a second stage set of higher speed multiplexers and so on. Each of the 31 samples per cycle of 32 is destined for a particular panel and may consist of a further multiplex or sub-multiplex of samples destined for each element of the panel. For example, there may be 16 elements per panel and 31 panels. As a result, the total number of elements in the array would then be 31×16=496. The total number of elements in the array may be changed by varying the number of calibration samples and panels multiplexed in the first stage of multiplexing or by varying the number of elements per panel. In the latter case, it is not important to have a multiplex cycle of a power of two, since the lower speed sub-multiplexers are easier to construct with any number of inputs.

Supposing now that each element radiates a composite signal with approximately a 1 MHz bandwidth, the number of complex samples per second per element required to satisfy the Nyquist sampling theorem is 1 million samples. The total number of samples per second over the K-band link would then be 512 million, comprising 32 sub-multiplex streams of 16 millions samples/sec of which 31 of the 16-million sample/sec streams are for respective array panels and one 16 million sample/sec stream consists of calibration samples. The 16-megasample/sec calibration stream can consist of known signal levels such as +1, −1 or 0 and can form a 16 Megabit code on the I and Q streams if desired. This is more than sufficient information with which to acquire and maintain synchronization as well as to send housekeeping information or commands to and from the satellite.

Calibration samples comprised of an I sample and a Q sample together form a complex sample. A transmitted complex sample of 1+j0 may be received as $A \cdot \cos(\theta) + jA \cdot \sin(\theta)$, where A is the received amplitude after attenuation over the propagation path and amplification in the receiver, and $\theta$ is the phase shift introduced on the path. The synchronization and frequency correction unit 45 can compute the sum of the squares of such I and Q calibration samples to yield $A^2$, which can be used to adjust the gain of the receiver 41 until the output calibration samples from the receiver 41 and the demultiplexers 43 and 44 are of a desired amplitude. This will ensure that array signal samples are also of a desired magnitude.

The absolute phase shift $\theta$ is of no consequence since only the relative phases of array signals are important. However, the rate of change of $\theta$ represents a frequency error, and the synchronization and frequency correction unit 45 can compute the rate of change of phase by combining successive I and Q calibration samples of the same type and $I(i-1), Q(i-1)$ and $I(i), Q(i)$ using the formula $$Q(i) \cdot I(i-1) - I(i) \cdot Q(i-1)$$

This formula gives a measure of how much the phase has rotated between successive calibration samples of the same type, and thus a measure of the frequency error. This can be used to correct the local oscillators used in the K-band receiver 41 until the frequency error is within acceptable limits. The number of samples/sec of frequency error which can be computed, as many as 16 million in the above example, is more than sufficient to ensure that a fast, accurate automatic frequency control feedback loop can be constructed. An element of the absolute phase $\theta$ can also be included in the automatic frequency control feedback, to form a phase lock loop as well as a frequency lock loop. This can be done by adding an element of the Q sample $A \cdot \sin(\theta)$ into the feedback loop, which becomes controlled to zero, thus controlling $\theta$ to the target value zero.

The clock generator 42, when synchronized under control of the synchronization unit 45 to separate out the expected calibration sample pattern, also generates output clock pulses and framing strobes for distribution to the array panels along with the respective separated signal samples for each panel.

Figure 5:
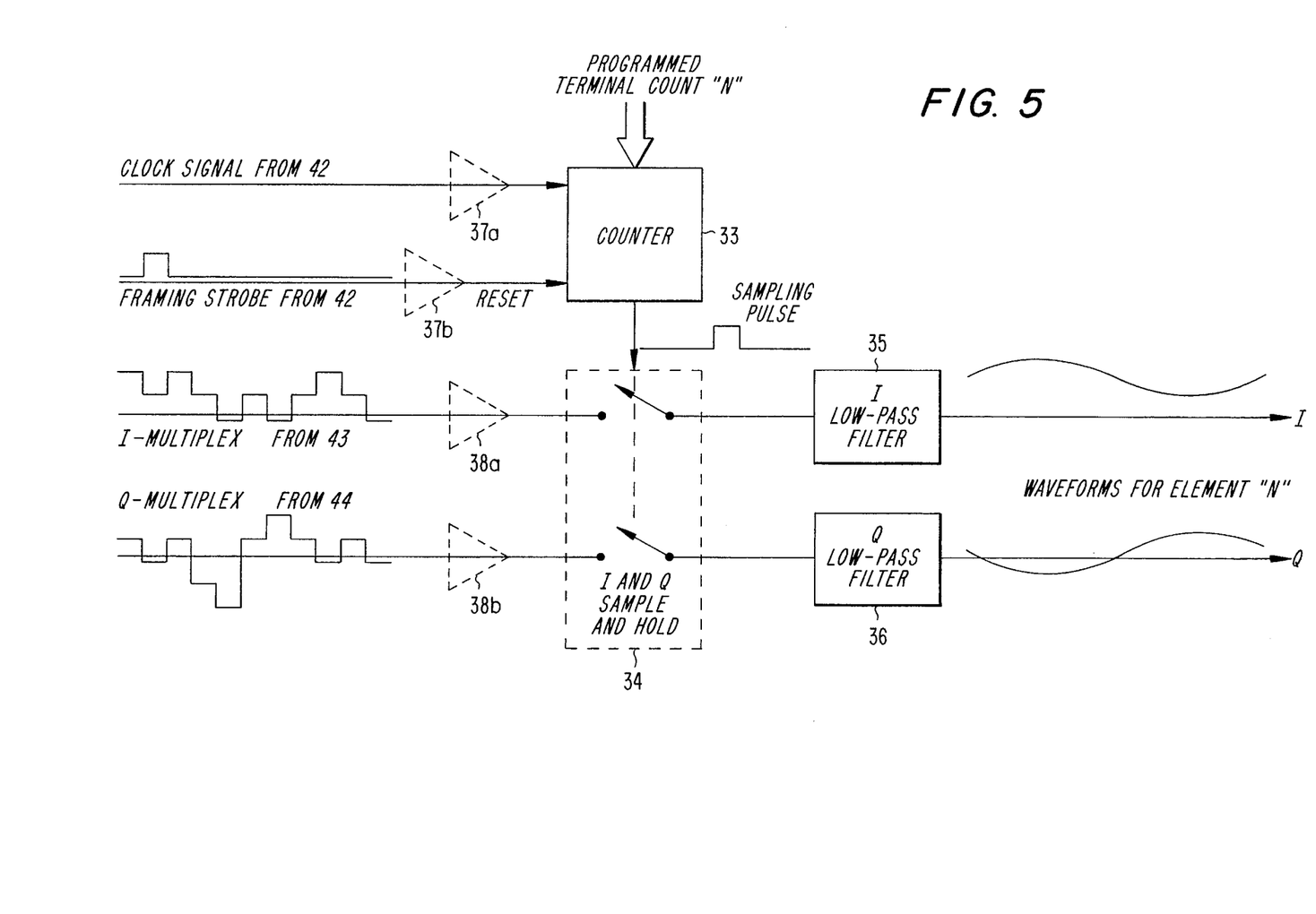
FIG. 5 illustrates a second stage of a receiving demultiplexor according to the present invention.

FIG. 5 illustrates how such clocks and strobes are used at each element of a particular panel. The clock signal from the unit 42 is buffered by a buffer amplifier 37a and used to drive a counter 33. The strobe signal from the unit 42 is buffered in a buffer amplifier 37b and used to reset the counter. The strobe signal can, for example, correspond to a time when a calibration sample is being separated by the demultiplexers 43 and 44 and no array element sample is being separated, wherein the strobe marks the start of the array sample separation from the time-multiplex format. The counter 33 is programmed with the number of clock pulses 'N' after the strobe at which it shall generate a sampling pulse for sample and hold circuits 34. This separates out the signal for the element N of the array panel in question from the I and Q multiplex streams. The buffer amplifiers 38a, 38b prevent glitches from the sampling switches 34 from being fedback to the I and Q multiplex line thus avoiding potential interference on the line, which is common to all elements of the panel. The separated I and Q samples for element 'N' are then converted to continuous modulating waveforms using low-pass filters 35 and 36 which have cutoff frequencies just less than half the sub-multiplexer sample rate (1 Megasample/sec in the above example).

Figure 6:
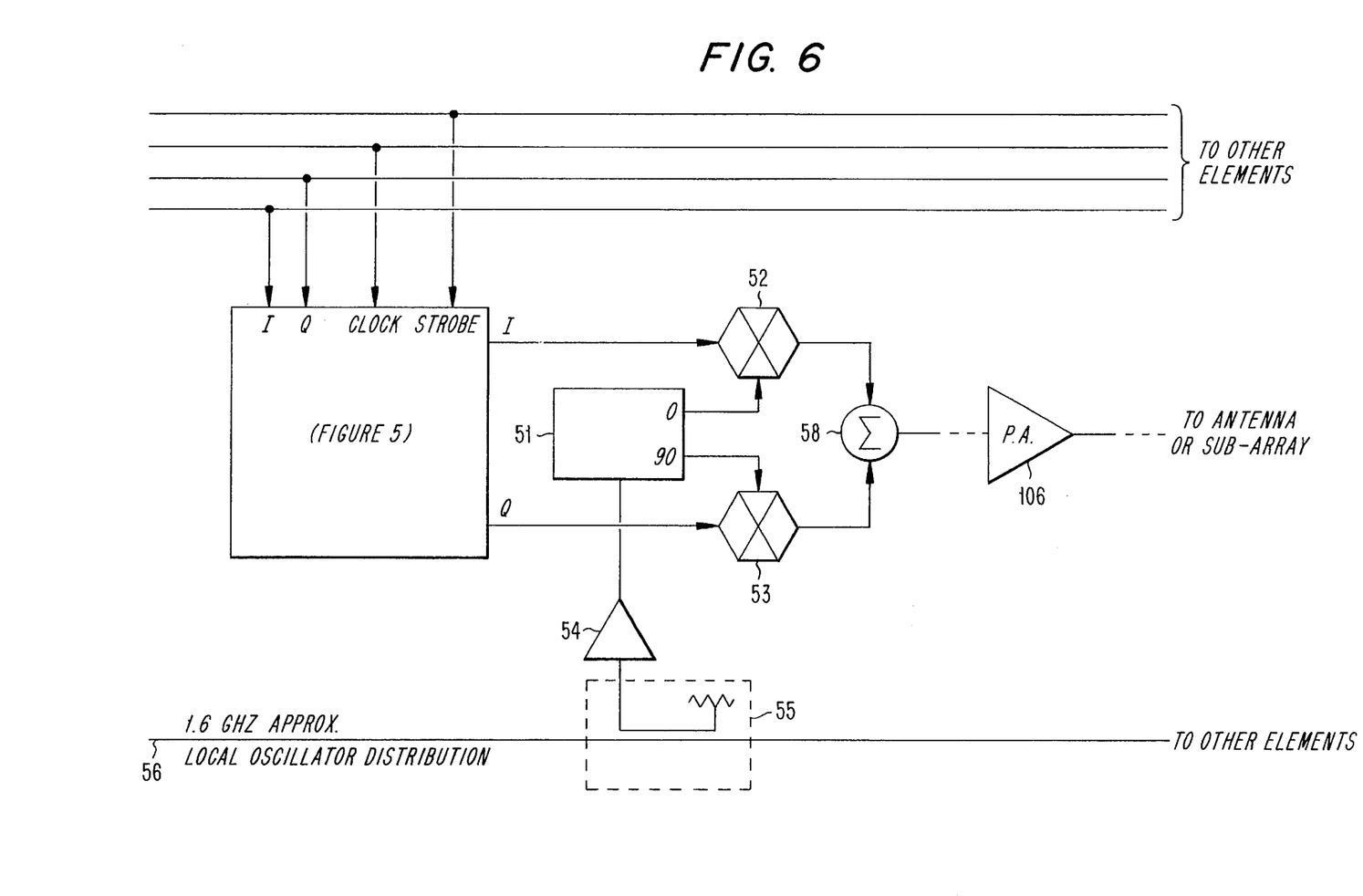
FIG. 6 illustrates quadrature modulation.

FIG. 6 illustrates how the continuous I and Q waveforms created by the circuit illustrated in FIG. 5 are used to quadrature modulate an L-band carrier using a quadrature modulator. The desired L-band center frequency is determined by a local oscillator signal 56 which is distributed to all elements along a stripline track on a printed circuit array panel, for example. A portion of the local oscillator signal is sampled off line 56 using a directional coupler 55 which can also be printed on the panel. After buffering in a buffer amplifier 54, the signal is split into components differing in phase by 90 degrees using a Hilbert network or phase shifter 51. The components drive respective I and Q balanced modulators which impress I and Q modulation on respective I and Q carrier waves. The modulated I and Q carrier waves are then summed at summing junction 58 to produce a signal to drive a power amplifier 106.

No steps need be taken to control the relative phase of the local oscillator 56 distributed to different elements, since any phase differences are fixed and stable in the medium term and as such can be compensated during generation of the elementary I and Q samples at the ground station. Allowed U.S. patent application Ser. No. 08/179,953, which has been incorporated herein by reference discloses the use of the mobile terminals to determine beamforming errors caused by imperfect compensation of such factors, periodically transmitting such measurements back through the satellite to the ground station on a return link.

Figure 7:
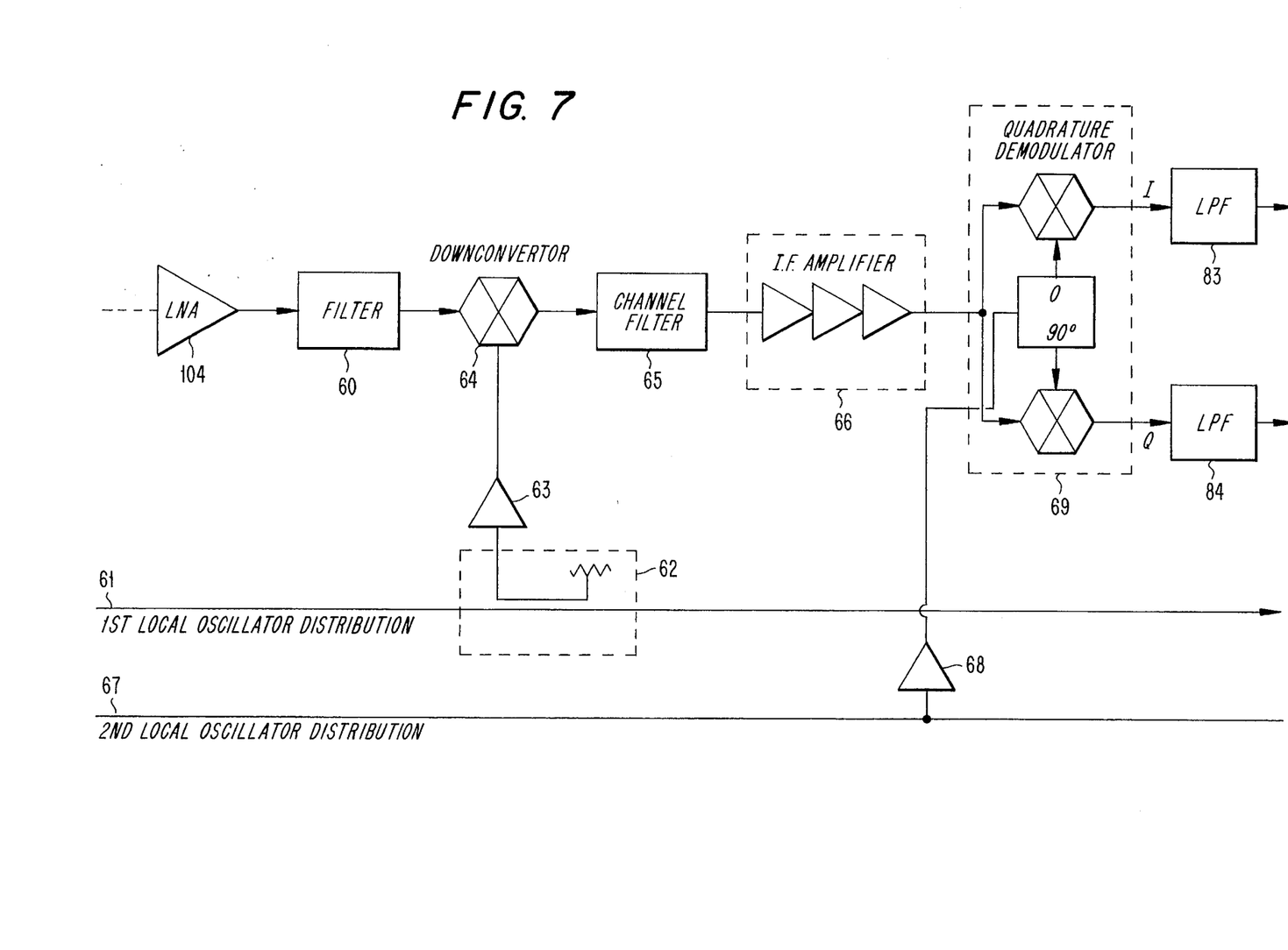
FIG. 7 illustrates receive processing elements according to the present invention.

FIG. 7 illustrates part of the receive signal processing network according to one embodiment of the present invention. The signal received at an array element or sub-array is amplified by the low-noise amplifier 104, and then after image rejection in a filter 64, the signal is downconverted in a mixer 64 by superheterodyning with a first local oscillator signal 61. The resulting signal is distributed to all elements along a printed circuit track, and each element samples a portion of the signal using a directional coupler 62 and a buffer amplifier 63. The received signal, having been mixed down to a suitable intermediate frequency, is filtered using a bandpass filter 65 to impose the desired total system bandwidth (1 MHz in the above example). The filtered signal is then further amplified using an intermediate frequency amplifier 66 to raise the signal to a convenient level. The amplified intermediate frequency signal is then quadrature downconverted to the complex (I,Q) baseband using a quadrature demodulator 69. A second Local Oscillator defines the center frequency of the bandwidth which is converted to baseband, and is distributed to all elements.

Figure 8:
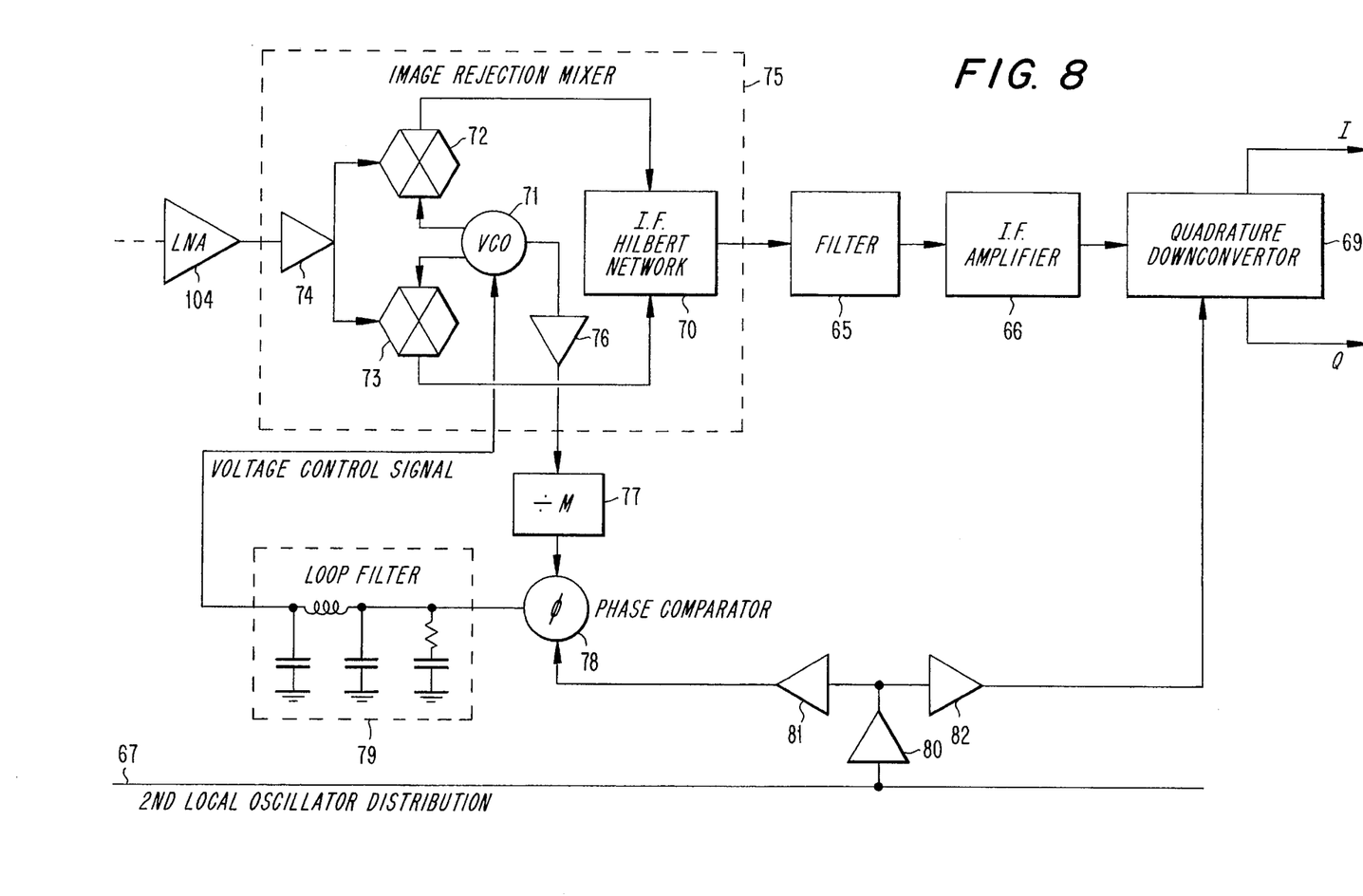
FIG. 8 illustrates receive processing elements according to another embodiment of the present invention.

Certain modifications can be made to the circuit illustrated in FIG. 8 to reduce the number of distributed local oscillators and to minimize the number of circuit components not suitable for integration into a silicon chip. For example, instead of using the image rejection filter 60, an image rejection mixer configuration 75 can be used, comprising a splitting amplifier 74, mixers 72 and 73 which are driven by quadrature local oscillator signals from quadrature VCO 71 and intermediate frequency Hilbert combining network 70.

The number of local oscillator signals to be distributed can be reduced if the first and second local oscillator frequencies are chosen to have a simple relation between them, for example 32:1. The first local oscillator frequency is then buffered by an amplifier 76 and fed to a digital divider 77 where it is divided by 32 for comparison in a phase comparator 78 with the distributed second local oscillator signal sampled off the line 67 by buffers 80 and 81. The error signal is then filtered using a loop filter 79 and applied to a voltage control input of a quadrature voltage controlled oscillator 71 to control its frequency and phase. Such circuits have also been reduced to practice and may be integrated into a single silicon chip comprising all of the blocks 75, 77, 78, 80, 81, 82, 66 and 69. Only non-integrable filters such as 103, 65 and 79 remain outside the chip, which occupies only a few square millimeters of silicon. Furthermore, the same technique can be used to locally create the transmit local oscillator signal 56, so that a single reference frequency only need be distributed to the elements along the array panels.

Figure 9:
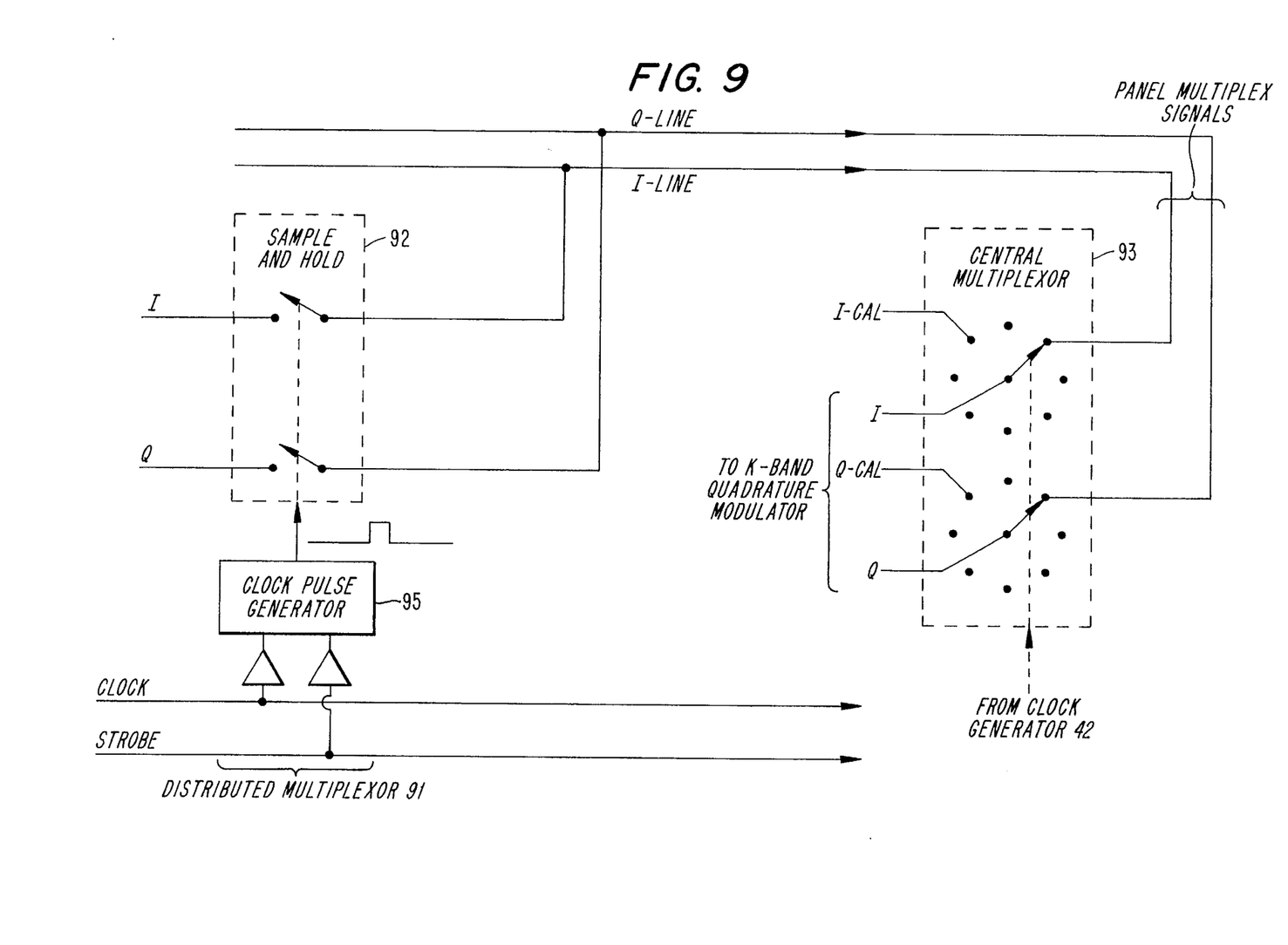
FIG. 9 illustrates receive processing and K-band transmit multiplexing elements according to one embodiment of the present invention.

FIG. 9 illustrates another receive processing circuit to multiplex the signals from each element of a panel into panel-multiplex signals, using distributed multiplexers 91 and 92 and finally the supermultiplexing of all panel signals using central multiplexer 93 which also incorporates calibration signals for similar use at the ground station to that described for the satellite, namely to effect synchronization acquisition, maintenance, automatic gain control and automatic frequency control. The distributed multiplexers 92 and 91 can be incorporated into the same silicon chip envisaged to realize the circuit of FIG. 8.

It is evident that the number of lines for distributing clocks and strobes is minimized if the clock and strobe for the receive processing can be the same as that used for transmit, and this is the preferred solution.

Many detailed variations in the present invention can be devised by a person skilled in the art with the help of material disclosed in allowed U.S. patent application Ser. No. 08/179,953, which has been incorporated herein. All such variations are deemed to lie within the scope and spirit of the invention as described by the following claims.

What is claimed is:

1. A satellite relay station for communicating between at least one first station and a plurality of second stations comprising:

a first number of hinged active antenna panels said active antenna panels further comprising at least:

time-multiplexer signal distribution means for distributing signals to a second number of active antenna elements means, said second number of active antenna element means each comprising:

a radiating element connected to a transmit power amplifier;

a modulator circuit with an input for modulating waveforms; and a sample and hold circuit to sample signals on said signal distribution line and to filter said sampled signal to form said modulation waveforms.

2. A communications satellite according to claim 1, further comprising:

feeder link receiver means for receiving a time-multiplex of array element signals from said at least one first station; and demultiplexer means to separate out for each of said active antenna panels a time-multiplexed signal for distribution using said signal distribution means.

3. A communications satellite according to claim 1, wherein said active antenna element means are divided into sub-arrays.

4. A satellite relay station for communicating between at least one first station and a plurality of second stations comprising:

a first number of hinged active antenna panels said active antenna panels further comprising at least:

time-multiplexed signal collection means for collecting signal samples from a second number of active antenna elements, said second number of active antenna element means each comprising at least:

a radiating element connected to a low-noise amplifier means;

a downconverting receiver circuit with an input connected to said low-noise amplifier and an output for downconverted waveforms;

a sampling circuit for sampling said downconverted waveforms output and applying said sampled signals to said collection means.

5. A communications satellite according to claim 4 further comprising:

central multiplexer means having inputs connected to said signal collection means from each of said first number of active antenna panels and a multiplexed output;

feeder link transmitter means connected to said multiplexed output for transmitting a time-multiplex of said active antenna element signals received from said second stations to said at least one first station.

6. A communications satellite according to claim 4, wherein said active antenna element means are divided into sub-arrays.

7. A method for relaying signals from a first station by a relay station using a phased array antenna comprising panels of antenna elements to at least a second station, comprising the steps of:

receiving signals from said first station;

amplifying, filtering and down convening said received signals;

converting said downconverted signals to a complex I,Q baseband;

sampling said converted signals to produce separated signal sample streams for each panel of said antenna and calibration samples;

generating output clock pulses and framing strobes using said calibration samples;

generating a sampling pulse using said clock pulses and said framing strobes to separate out signal samples from said signal sample streams for a particular element on a panel of said antennas elements;

convening said signal samples into continuous modulating waveforms;

modulating a carrier using said continuous modulating waveforms to produce a drive signal; and driving a power amplifier with said drive signal to produce a signal for transmission to said at least said second station using said particular antenna element.

* * * * *